Figure 1:
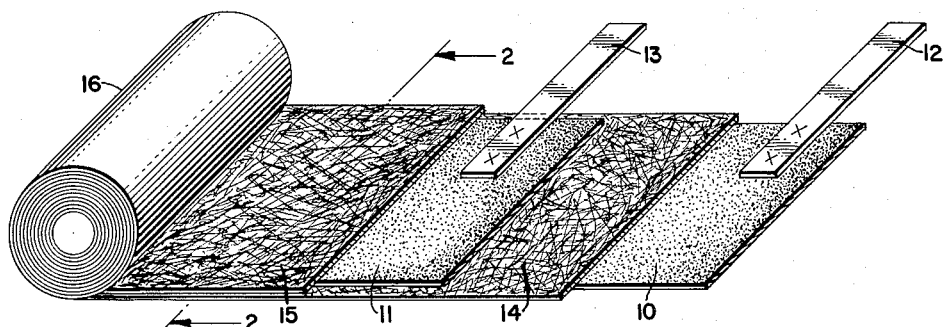

Nov. 1, 1955     J. B. BRENNAN     2,722,637
ELECTROLYTIC CONDENSERS
Filed Feb. 3, 1951

INVENTOR
JOSEPH B. BRENNAN

BY *Young, Emery & Thompson*
ATTORNEYS

United States Patent Office 2,722,637
Patented Nov. 1, 1955

2,722,637

ELECTROLYTIC CONDENSERS

Joseph B. Brennan, Cleveland, Ohio

Application February 3, 1951, Serial No. 209,270

3 Claims. (Cl. 317—230)

This invention relates to electrolytic condensers, rectifiers, lightning arresters and the like and to methods of making the same, and more particularly to spacers for such devices and methods of assembling devices embodying such spacers. The invention is described herein as applied to an electrolytic condenser of the paste type, but it is also useful in connection with other electrolytic devices such as rectifiers, lightning arresters, other types of condensers and the like. Insofar as common subject matter is concerned, this application is a continuation in part of my copending applications Serial No. 698,865, filed September 23, 1946 and Serial No. 709,859, filed November 14, 1946, which are now abandoned.

Electrolytic condensers of the so-called dry or paste type ordinarily comprise two or more electrodes composed, for example, of aluminum foil or cloth sprayed with aluminum, provided with suitable terminals and separated by thin permeable separators. At least one of the electrodes is provided with an electroformed dielectric film, and the electrolyte is a pasty composition containing a borate or other film-forming or maintaining material. The assembly of electrodes and intermediate separators is ordinarily rolled into a generally cylindrical form; the separators function not only to prevent contact between the electrodes, but also to retain the electrolyte in the space between the electrodes. Heretofore separators for electrolytic condensers have been made of cloth woven in open mesh form from highly purified cotton or of paper which has been carefully treated and purified to eliminate any damaging substances therefrom. Both of these materials are relatively expensive, and the cost of the separators is a not inconsiderable portion of the cost of the completed condenser. Furthermore, such separators are not entirely satisfactory from an operating standpoint because the permeability and thickness of the cloth spacers are not uniform throughout due to their woven construction, while the paper spacers are of lesser permeability and may contain impurities.

It is, therefore, a general object of the present invention to provide separators which are less expensive than and have operating characteristics superior to the separators heretofore employed. Other objects are the provision of condenser assemblies embodying such separators and the provision of methods for making condensers embodying such separators.

According to the present invention, the above and other objects and advantages are attained by employing as separators in electrolytic condensers thin, dry laid, loose layers of unwoven, untwisted fibers in which the fibers extend preferably in random directions. These layers are extremely permeable because of the looseness of the arrangement of fibers which are not felted together in the manner of the fibers making up a paper sheet. In fact, the layers are so loose and thin as to have very little tensile strength, the fibers being held in place in the assembled condensers principally by the pressure of the electrodes on either side of the layers of fibers. Such fiber layers are highly advantageous in condensers because they are of substantially uniform thickness, and of uniformly high permeability throughout. Because of the uniformity and high permeability of my spacers, the spacing of the electrodes can be less than with conventional woven spacers, and efficient use can be made of the entire electrode area.

The separators consisting of layers of fibers can be manufactured and incorporated in condensers much more economically than conventional separators for the reason that the weaving or felting operations required in conventional woven separators and conventional paper separators, respectively, are eliminated. The fibers may be formed into thin, loose batts and assembled with the electrodes to constitute the separators, or they may be applied to the electrodes immediately before the electrodes are rolled together or otherwise assembled in the form of loose, discrete fibers. After the electrodes and separators have been rolled into cylindrical form or otherwise assembled, the condensers are impregnated with the film-maintaining electrolyte, which may be of any suitable composition known to those skilled in the art.

In case synthetic thermoplastic fibers are used in carrying out this invention, the edges of the separators so produced extending beyond the electrode edges may be best sealed to hold them in place prior to rolling, and may be heat attached at the edges of the electrodes at spaced intervals to prevent shifting during winding and also to hold the electrode and the separator in place prior to winding and thereafter. This heat bonding of the separator to the electrode is accomplished by heated rolls or heated projecting areas on rolls which will fuse the thermoplastic fiber in small spaced areas sufficient to keep the electrode and spacer in alignment.

If preferred, synthetic fiber batts may be pre-welded before incorporation in the condenser assembly at spaced intervals by heat and pressure application or by heat alone so as to make the batt easier to handle prior to and during winding and assembly.

Where multiple anodes are assembled on a spacer in aligned spaced relation prior to winding, they may be heat sealed or cemented on location on the spacer prior to assembly, and this speeds up and makes the alignment more accurate. Also it permits segregation of the work among several work positions and simplifies the operations and assembly of condensers. It helps greatly in assembling stacked condensers also by keeping the stacked plates and separators in alignment.

Figure 2:
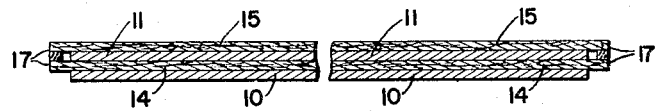
Figure 3:
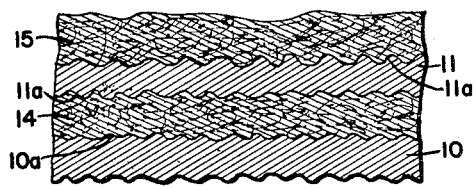
Figure 4:
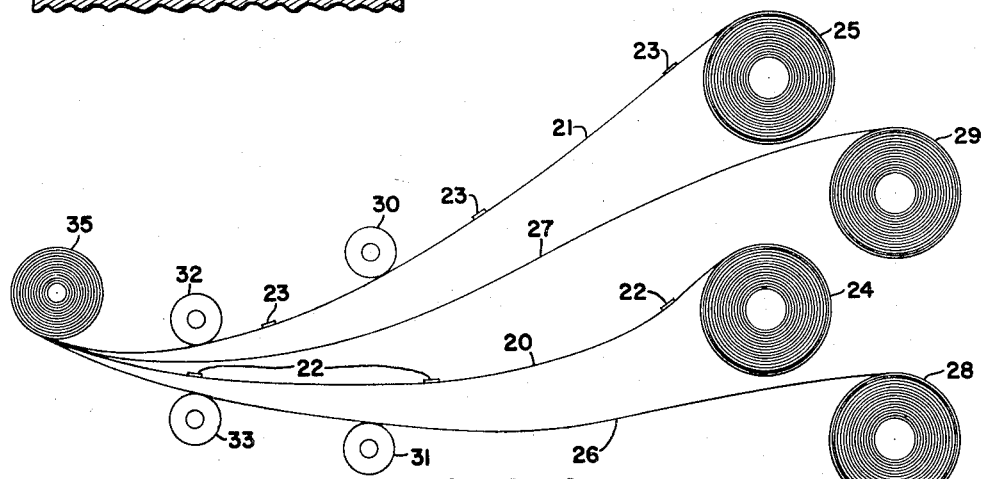

Referring now to the drawings, Figure 1 illustrates a more or less conventional rolled type of condenser with the electrodes and separators partially unrolled to show the construction; Figure 2 is a section through the condenser of Figure 1 as indicated by the line 2—2 of Figure 1; Figure 3 is a section on an enlarged scale showing the manner in which the fibers are held between electrodes having roughened surfaces; and Figure 4 diagrammatically illustrates one method of assembling condensers embodying my invention. In all of the figures of the drawings, the parts are necessarily indicated in somewhat diagrammatic fashion; the thicknesses of the parts are exaggerated and are not necessarily in correct proportion.

As shown in Figure 1, a condenser embodying my invention may comprise electrodes 10 and 11 provided with suitable terminals 12 and 13, respectively, welded or otherwise secured thereto and spaced apart by separators 14 and 15, the electrodes and separators being rolled into substantially cylindrical form as indicated at 16. The completed assembly is impregnated with a suitable viscous film-maintaining electrolyte paste, composed, for example, of glycol and boric acid, and the whole may be encased in a suitable cover composed of cardboard or metal or the like (not shown). It will be evident that the condenser may take any well known form and be made in various sizes and capacities.

The electrodes 10 and 11, while they may be composed of ordinary aluminum foil or foil composed of another film-forming metal, are preferably provided with roughened surfaces to give them increased effective area, and accordingly to give the condenser increased capacity per square inch of electrode. If aluminum foil is employed, it may be etched in the manner described in my Patent No. 2,154,027, issued April 11, 1939, to roughen its surface and give it additional area. Foil coated with sprayed film-forming metal, as described in my Patent No. 2,104,018, issued January 4, 1938, may also be employed; instead of using foil, I may employ a cloth base electrode having spray-deposited surfaces of film-forming metal as described in my Patent No. 2,280,789, issued April 28, 1942, or other electrode construction may be used. The roughened surface electrodes are not only advantageous because of the additional capacity obtainable thereby, but also are especially advantageous with my fiber layer separators because the roughened surfaces of the electrodes assist in retaining the fibers in place. This effect is diagrammatically illustrated on an enlarged scale in Figure 3 of the drawings, the roughened surfaces of the electrodes being illustrated at 10a and 11a.

The separators 14 and 15 consist, as noted above, of thin loose layers of fibers arranged in random directions. The fibers must be composed of material which will not react with the electrolyte or otherwise contaminate the condenser and which can withstand the temperatures the condenser may reach in operation. Purified cellulosic fibers are particularly suitable. The fibers may be of short staple such as cotton linters, purified cellulosic fibers from wood pulp, viscose rayon scrap or waste, or cotton fibers or any organic fiber or synthetic textile fibers, which have the ability to withstand the conditions encountered in the condenser without contaminating it, such as nylon, may be employed. The assembly may be carried out by laying a thin batt composed of fibers on the electrode 10 to constitute the separator 14, then positioning the electrode 11 on top of the separator 14 and finally applying another batt on the surface of the electrode 11 to constitute the separator 15. These operations may be carried out with the parts in a flat, horizontal position. The assembly is completed by rolling the electrodes and interleaved separators into substantially cylindrical form as shown at 16, and thereafter impregnating the assembly with the electrolyte. The impregnation is ordinarily carried out by immersing the assembly in a vat of heated electrolyte and subjecting it alternately to vacuum and pressure to insure that substantially all of the air will be removed from the spaces between the electrodes and that the electrolyte will fill all of the space between the electrodes and permeate the separators, and electrodes themselves if they are of porous construction. The impregnation may also be carried out in a centrifuge, or by pressure alone or by immersion alone.

Instead of employing batts, the fibers may be deposited on the electrodes in free, i. e., discrete, form as by spraying them on with a spray gun or by sifting them on through a screen, thereby forming the layer in situ. If either of these methods are employed, the electrodes are preferably coated with a pasty material as noted above to retain the fibers in position during the operation of depositing them on the electrodes. The paste may be, for example, composed of glycol and boric acid where a compatible electrolyte, or one of similar composition is to be employed; the paste may be thicker and more viscous than the electrolyte. The paste may be applied by painting the electrodes prior to deposition of the fibers, by spraying the electrodes with the paste either before the fibers are deposited thereon, or simultaneously with the spraying the fibers thereon, or by mixing the paste and fibers together and coating the mixture onto the electrodes as by spraying. The assembly is completed in the manner described above, and after assembly, the pressure of the electrode faces on the fiber layers compresses the layers to substantially uniform thickness and retains the layers securely in position.

The fibers may be applied to the electrode surfaces immediately before the electrodes are rolled into cylindrical form, the rolling operation compressing the fibers into layers of substantially uniform thickness and retaining them in place. The operations of rolling and depositing the fibers may be carried on simultaneously. For example, when separators in the form of batts are employed, they may be fed into the rolling apparatus with the electrodes.

An apparatus for carrying out this operation is illustrated diagrammatically in Figure 4 of the drawings. As there shown, electrode strips 20 and 21 having terminals 22 and 23 secured thereto at intervals corresponding to the ultimate length of the electrodes may be fed from supply rolls 24 and 25. Separators 26 and 27 in the form of thin loose batts composed of cotton or other suitable fibers are simultaneously fed from supply rolls 28 and 29, suitable guide rolls 30, 31, 32 and 33 being employed to guide the electrodes and interposed separators together. The strips are wound into cylindrical form as at 35 to provide the electrode and spacer assembly. The electrode strips and spacers are severed after the length desired for one assembly has been wound; the winding operation is then started over again to make another assembly, the strip again severed, and so on, each severed portion of the electrodes being provided with a terminal.

If the fibers are applied in discrete form, they also may be applied to the electrodes as the electrodes are moving to the rolling apparatus, the rate of deposition and the speed of movement of the electrode strip being correlated to produce layers of the desired thickness.

It will be noted that the fibers, as shown in Figure 2, preferably extend beyond the edges of the active electrode surfaces; individual fibers of the layers projecting as indicated at 17 in Figure 2 prevent any possibility of short-circuiting at the edges.

From the foregoing description of preferred forms of my invention, it will be seen that I have provided separators for electrolytic condensers and similar devices which can be manufactured at low cost and which will give excellent results in use. Condenser assemblies embodying my invention can be manufactured economically and expeditiously by the methods disclosed herein. The fibers used may be subjected to purifying operations before incorporation in the condensers, and after being purified, the fibers require no handling prior to the incorporation in condensers as distinguished from the spinning, weaving, felting and like operations required in the manufacture of gauze and paper separators. The elimination of these operations not only results in an economical separator construction, but reduces the possibility of contamination of the completed device by reason of impurities in the separator.

Those skilled in the art will appreciate that various changes and modifications may be made in my invention without departing from the spirit and scope thereof. It is, therefore, to be understood that my patent is not limited to the preferred forms described herein or in any manner other than by the appended claims.

Having thus described my invention, What I claim is:

1. An electrode and spacer assembly impregnated with an electrolyte, said assembly comprising a plurality of spaced electrodes and interleaved spacer layers containing electrolytically inert, synthetic dielectric fibers, at least a portion of which are thermoplastic, said spacer layers having margins extending beyond the electrode edges and being integrally bonded at spaced intervals to the edges of the next succeeding spacer layer.

2. An electrode and spacer assembly impregnated with an electrolyte, said assembly comprising a plurality of spaced electrodes and interleaved spacer layers containing electrolytically inert, synthetic dielectric fibers, at least a portion of which are thermoplastic, said spacer layers having margins extending beyond the electrode edges and being integrally bonded at spaced intervals to the edges of the next succeeding spacer layer, and at discrete points to at least one of the electrodes spaced by the layers of fibers.

3. An electrode and spacer assembly impregnated with an electrolyte, said assembly comprising a plurality of spaced electrodes and interleaved spacer layers containing electrolytically inert, dielectric fibers, said spacer layers having margins extending beyond the electrode edges and being bonded by thermoplastic material at spaced intervals to the fibers of the next succeeding spacer layer, and at discrete points to at least one of the electrodes spaced by the layers of fibers.

References Cited in the file of this patent

UNITED STATES PATENTS

| | | |
|---|---|---|
| 646,922 | Sperry | Apr. 3, 1900 |
| 1,658,976 | Edelman | Feb. 14, 1928 |
| 1,744,302 | Engle et al. | Jan. 21, 1930 |
| 2,018,522 | Herrman et al. | Oct. 22, 1935 |
| 2,066,912 | Ruben | Jan. 5, 1937 |
| 2,083,889 | Wyatt | June 15, 1937 |
| 2,134,273 | Bush | Oct. 25, 1938 |
| 2,182,376 | Gray | Dec. 5, 1939 |
| 2,206,720 | Ducati | July 2, 1940 |
| 2,297,607 | Blackburn | Sept. 29, 1942 |
| 2,310,932 | Brennan | Feb. 16, 1943 |
| 2,335,757 | Hall | Nov. 30, 1943 |
| 2,336,797 | Maxwell | Dec. 14, 1943 |